Feb. 16, 1932.        J. A. SPENCER        1,845,357
TEMPERATURE CONTROLLED APPARATUS
Original Filed April 3, 1925
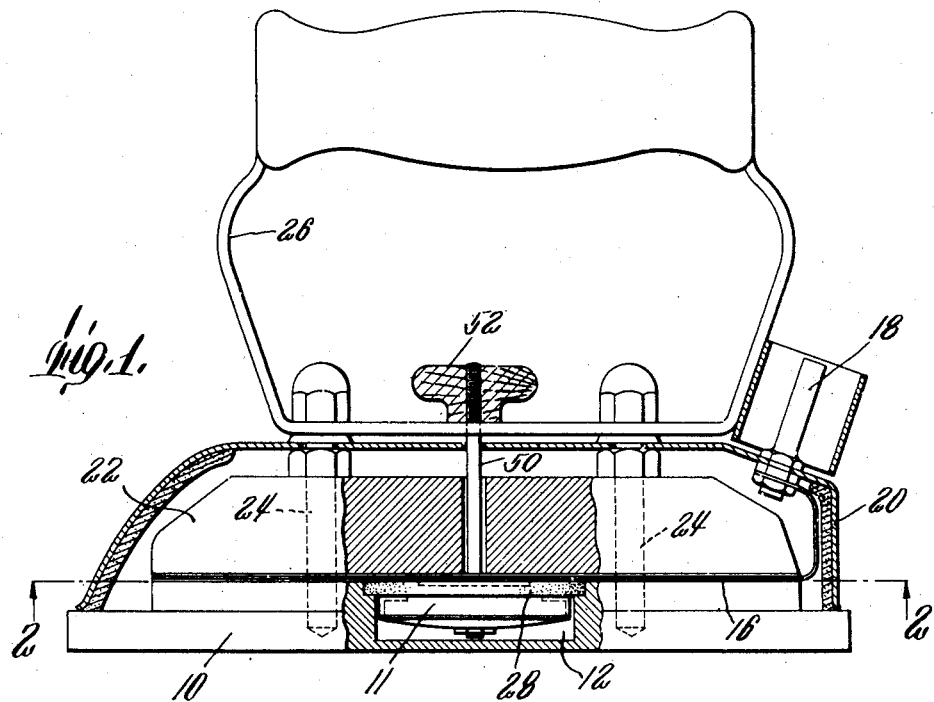
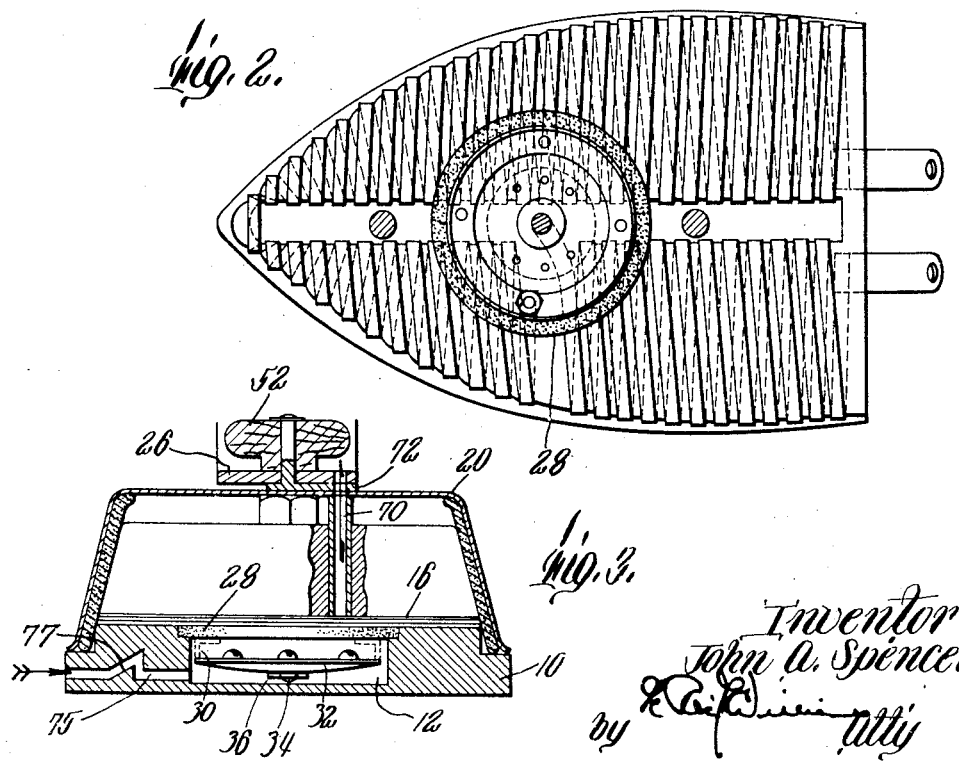
Inventor
John A. Spencer
by [signature] Atty Patented Feb. 16, 1932

1,845,357

UNITED STATES PATENT OFFICE

JOHN A. SPENCER, OF NEWTONVILLE, MASSACHUSETTS, ASSIGNOR TO SPENCER THERMOSTAT COMPANY, OF CAMBRIDGE, MASSACHUSETTS, A CORPORATION OF MASSACHUSETTS

TEMPERATURE CONTROLLED APPARATUS

Original application filed April 3, 1925, Serial No. 20,455. Divided and this application filed January 4, 1929, Serial No. 330,404. Renewed November 15, 1930.

The present invention relates to temperature controlled apparatus and more particularly to such apparatus embodied in thermostatic controlled sadirons.

As disclosed in the patent to Spencer 1,448,240, granted March 13, 1923, the electric heating circuit of a sadiron may be suddenly opened when the sadiron reaches a predetermined temperature limit and automatically closed when the temperature of the sadiron drops to a certain predetermined lower limit. This is accomplished by the use of a thermostatic member which suddenly and abruptly changes shape at predetermined temperature limits.

This application is a division of my application, Serial No. 20,455, filed April 3, 1925. In this application is disclosed means for varying the operation of the thermostatic control with respect to the temperature of the sadiron or similar apparatus in such a manner that the heating current may be automatically cut off at different temperatures of the sadiron, this being done by auxiliary apparatus. The thermostatic control serves to open or close the heating circuit when the temperature of the control reaches certain predetermined upper and lower limits. By varying the relation between the temperature of the control and the temperature of the sadiron itself, the opening and closing of the heater circuit may be caused to take place at variable temperature limits of the sadiron.

In one simple form of the invention the temperature of the thermostatic member with respect to the surrounding base of the sadiron is varied by controlling the temperature of the medium surrounding the thermostat. This medium is preferably air. The structure in general is so designed that the thermostat is in the path of a current of air, the flow of which may be controlled at will. By allowing the current of air to flow over the thermostat, it is clear that the latter may be cooled by the air, thus allowing the sadiron or other apparatus to come to a higher temperature before being sufficiently hot to open the circuit.

Still further features of the invention consist in certain novel features of construction, combinations and arrangements of parts hereinafter described and claimed, the advantages of which will, to those skilled in the art, be clear from the following description.

In the accompanying drawings, illustrating a preferred form of the invention, Figure 1 is a longitudinal section of a sadiron;

Figure 2 is a horizontal section taken upon the line 2—2 of Figure 1; and,

Figure 3 is a cross section illustrating a method of controlling the temperature of the thermostatic disk.

Similar reference characters indicate corresponding parts through the several views of the drawings.

The sadiron shown in the illustrated embodiment of the invention comprises a base member 10 having a recess 12 formed therein in which the thermostat assembly indicated at 11 is located. The base member 10 is surmounted by a flat heating coil 16 of the usual form, which is connected to the usual terminal plug 18 mounted upon the sheet metal shell 20 of the iron. The heating coil is surmounted by a weight member 22 and the several parts are retained in assembled relation by bolts 24, a handle 26 being connected to the iron by the bolts.

As indicated clearly in Figures 1 and 3, the recess 12 is closed by a disk 28 of insulating material which carries a stationary contact ring 30 cooperating with a thermostatic disk 32. The thermostatic disk is mounted upon a supporting stem 34 which may be molded into the disk 28 and is held in place by a locking nut 36. The electric heating circuit includes the stationary contact ring 30, the thermostatic disk 32, and stem 34, connecting the disk 32 with the heating coil 16. It will be clear from this construction that the temperature of the thermostatic disk normally approximates the temperature of the base 10 surrounding the disk.

The temperature of the disk in the present construction may be controlled, Fig. 3, as follows. A passage or duct 70 for the flow of convection currents extends from an opening in the disk 28 upwardly through the flatiron venting above the shell 20, this opening being controlled by a perforated disk 72, Fig.

3, mounted upon the upper portion of the flatiron and serving to open or close the upper open portion of the passage 70. Formed in the base of the flatiron and leading into the recess 12 is a second passage or duct 75 which cooperates with the passage 70 to establish or set up convection currents. This duct 75 offers a tortuous path to air flowing therethrough because of the provision of a jog or the like 77. The provision of such a tortuous path is effective in mitigating the entrance of foreign matter into the space 12. The position of the perforated disk 72 may be adjusted by a knob 52. It will be clear that this construction tends to reduce the temperature of the thermostatic disk with respect to the surrounding base of the sadiron because of the convection currents from the outer atmosphere.

It will be understood by those skilled in the art that the electric heating circuit is broken by an abrupt change in shape of the thermostatic disk 32, removing the disk from contact with ring 30. Upon the cooling of the disk to a predetermined temperature, it changes shape abruptly and contacts with ring 30 to close the electric heating circuit. Thus there is provided a device which will operate automatically in response to temperature changes, and a devise in which the actuating temperature changes may be varied to suit different conditions of use to which the device is to be put.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In an electric sadiron having a base member and a weight member, the combination with an electrically energized heating element, of a thermostat, switching means for controlling the said heating element associated with the thermostat, the said thermostat being in heat conducting relation to the said heating element, said base member being provided with means for providing a current of air to flow by the said thermostat and through the weight member, and means for controlling the rate of flow of the said air.

2. In an electric sadiron, a heating element, a thermostat immediately contiguous thereto, switching means for controlling the said heating element associated with the said thermostat, said sadiron being provided with ducts passing therethrough adapted to provide a flow of air to and from the thermostat, a cover plate associated with one of the said ducts and means for varying the position of the said cover plate with respect to the duct.

3. In an electric sadiron, a heating element, a snap acting thermostat in heat conducting relation thereto, switching means associated with the said thermostat for controlling the said heating circuit, said sadiron being provided with ducts leading to and from said thermostat and passing through the said iron providing a flow of air past the said thermostat, and means associated with at least one of the said ducts for controlling the flow of the said air.

4. In an electric sadiron, a heating element, a thermostat immediately contiguous thereto, switching means for controlling the said heating element asociated with the said thermostat, said sadiron being provided with ducts passing therethrough adapted to provide a flow of air to and from the thermostat, a cover plate associated with one of the said ducts and means for varying the position of the said cover plate with respect to the duct, at least one of said ducts being provided with a portion adapted to permit passage of air but to resist insertion therethrough of foreign articles.

In testimony whereof, I have signed my name to this specification.

JOHN A. SPENCER.